United States Patent
Askari et al.

(10) Patent No.: US 12,286,124 B2
(45) Date of Patent: Apr. 29, 2025

(54) IDENTIFICATION AND MITIGATION CONTROL OF PULL FORCE IMPACTS WHEN PASSING LARGE VEHICLES IN AUTOMATED DRIVING

(71) Applicant: GM GLOBAL TECHNOLOGY OPERATIONS LLC, Detroit, MI (US)

(72) Inventors: Hassan Askari, Thornhill (CA); Mohammadali Shahriari, Markham (CA); Reza Zarringhalam, Whitby (CA); Ashraf Abualfellat, Grand Blanc, MI (US); Daniel James Cornelius, Detroit, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 241 days.

(21) Appl. No.: 18/061,709

(22) Filed: Dec. 5, 2022

(65) Prior Publication Data
US 2024/0182040 A1  Jun. 6, 2024

(51) Int. Cl.
*B60W 40/10* (2012.01)
*B60W 50/14* (2020.01)
*B60W 60/00* (2020.01)

(52) U.S. Cl.
CPC ............ *B60W 40/10* (2013.01); *B60W 50/14* (2013.01); *B60W 60/001* (2020.02); *B60W 2050/146* (2013.01); *B60W 2530/203* (2020.02); *B60W 2554/4023* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 11,628,863 B1 * | 4/2023 | Huang | B60W 60/0023 701/24 |
| 2021/0179111 A1 * | 6/2021 | Kim | B60W 60/0016 |
| 2021/0221363 A1 * | 7/2021 | Lai | G08G 1/165 |
| 2022/0105934 A1 * | 4/2022 | Shieh | B60W 40/1005 |
| 2022/0324444 A1 * | 10/2022 | Germain | B62D 15/025 |
| 2022/0332307 A1 * | 10/2022 | McClain | B60D 1/30 |

FOREIGN PATENT DOCUMENTS

WO  WO-2016007636 A1 *  1/2016 ............. B60T 17/22

* cited by examiner

*Primary Examiner* — Jonathan L Sample
*Assistant Examiner* — Alan Lindsay Ostrow
(74) *Attorney, Agent, or Firm* — Lorenz & Kopf LLP

(57) ABSTRACT

Methods and systems are provided for determining and mitigating vehicle pull force from passing other vehicles. In an exemplary embodiment, methods and systems are provided that include: obtaining sensor data via one or more sensors of a vehicle, the sensor data including both perception sensor data and vehicle dynamics sensor data; identifying, via a processor, one or more additional vehicles to be passed by the vehicle, using the perception sensor data; and predicting and determining, via the processor, a pull force for the vehicle that is caused by the passing of the vehicle by the one or more additional vehicles along with an impact of the pull force on the vehicle, based on both the perception sensor data and the vehicle dynamics sensor data, and control the vehicle to proactively mitigate the pull force on the vehicle; and vehicle with trailer when towing.

20 Claims, 6 Drawing Sheets

IDENTIFICATION AND MITIGATION CONTROL OF PULL FORCE IMPACTS WHEN PASSING LARGE VEHICLES IN AUTOMATED DRIVING

INTRODUCTION

The technical field generally relates to vehicles and, more specifically, to methods and systems for identification and mitigation of pull force impacts when one vehicle passes another vehicle.

When vehicles today pass other vehicles on a roadway, the vehicles may experience a pull force, for example that may cause oscillation of the vehicles. This may be relatively more significant, for example, in situations in which a vehicle is passing a large vehicle (such as a truck), and/or whether the vehicle is hitched to a tow vehicle.

Accordingly, it is desirable to provide improved methods and systems for identifying and mitigating pull force impacts when a vehicle is passing another vehicle, such as when a vehicle or vehicle/trailer system are passing a truck or other relatively large vehicle on a roadway. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: obtaining sensor data via one or more sensors of a vehicle, the sensor data including both perception sensor data and vehicle dynamics sensor data; identifying, via a processor, one or more additional vehicles to be passed by the vehicle, using the perception sensor data; and determining, via the processor, a pull force for the vehicle that is caused by the passing of the vehicle by the one or more additional vehicles along with an impact of the pull force on the vehicle, based on both the perception sensor data and the vehicle dynamics sensor data.

Also in an exemplary embodiment, the method includes automatically taking a vehicle action, in accordance with instructions provided by the processor, based on the pull force and the impact of the pull force on the vehicle.

Also in an exemplary embodiment, the method includes determining, via the processor, one or more corrective actions for the vehicle to mitigate the impact of the pull force, based on the sensor data.

Also in an exemplary embodiment, the step of automatically taking the vehicle action includes automatically controlling braking, steering, or propulsion of the vehicle, in accordance with instructions provided by the processor to a braking system, a steering system, or propulsion system of the vehicle to implement the one or more corrective actions.

Also in an exemplary embodiment, the step of automatically taking the vehicle action includes automatically providing a recommendation for a driver of the vehicle for controlling braking, steering, or propulsion of the vehicle to implement the one or more corrective actions.

Also in an exemplary embodiment, the method further includes determining, via the processor using the perception sensor data, a zone classification for the vehicle, wherein the zone classification is divided into three potential zones; namely, (i) a pre-event zone, (ii) an event zone, and (iii) a post-event zone, and wherein the one or more corrective actions are dependent upon a current value of the zone classification for the vehicle.

Also in an exemplary embodiment, the one or more corrective actions are based at least in part on a plurality of parameters from the vehicle dynamics sensor data that include lateral and longitudinal distances and relative lateral and longitudinal velocities between the vehicle and the one or more additional vehicles.

Also in an exemplary embodiment, the method further includes utilizing a pull force impact determined via the processor in a reactive mode to update the prediction model for pre-event detection for upcoming events.

In another exemplary embodiment, a system is provided that includes: one or more sensors configured to obtain sensor data for a vehicle, the sensor data including both perception sensor data and vehicle dynamics sensor data; and a processor that is coupled to the one or more sensors and that is configured to at least facilitate: identifying one or more additional vehicles to be passed by the vehicle, using the perception sensor data; and determining a pull force for the vehicle that is caused by the passing of the vehicle by the one or more additional vehicles along with an impact of the pull force on the vehicle, based on both the perception sensor data and the vehicle dynamics sensor data.

Also in an exemplary embodiment, the processor is further configured to at least facilitate automatically taking a vehicle action, in accordance with instructions provided by the processor, based on the pull force and the impact of the pull force on the vehicle.

Also in an exemplary embodiment, the processor is further configured to at least facilitate determining one or more corrective actions for the vehicle to mitigate the impact of the pull force, based on the sensor data; and automatically controlling braking, steering, or propulsion of the vehicle, in accordance with instructions provided by the processor to a braking system, a steering system, or propulsion system of the vehicle to implement the one or more corrective actions.

Also in an exemplary embodiment, the processor is further configured to at least facilitate determining one or more corrective actions for the vehicle to mitigate the impact of the pull force, based on the sensor data; and automatically providing a recommendation for a driver of the vehicle for controlling braking, steering, or propulsion of the vehicle to implement the one or more corrective actions.

Also in an exemplary embodiment, the processor is further configured to at least facilitate determining, using the perception sensor data, a zone classification for the vehicle, wherein the zone classification is divided into three potential zones; namely, (i) a pre-event zone, (ii) an event zone, and (iii) a post-event zone, and wherein the one or more corrective actions are dependent upon a current value of the zone classification for the vehicle.

Also in an exemplary embodiment, the one or more corrective actions are based at least in part on a plurality of parameters from the vehicle dynamics sensor data that include lateral and longitudinal distances and relative lateral and longitudinal velocities between the vehicle and the one or more additional vehicles.

In another exemplary embodiment, a vehicle is provided that includes: a body; one or more sensors disposed on or within the body and that are configured to obtain sensor data for the vehicle, the sensor data including both perception sensor data and vehicle dynamics sensor data; and a processor disposed within the body and coupled to the one or more sensors, and that is configured to at least facilitate: identifying one or more additional vehicles to be passed by the vehicle, using the perception sensor data; and determining a pull force for the vehicle that is caused by the passing of the vehicle by the one or more additional vehicles along with an impact of the pull force on the vehicle, based on both the perception sensor data and the vehicle dynamics sensor data.

Also in an exemplary embodiment, the processor is further configured to at least facilitate automatically taking a vehicle action, in accordance with instructions provided by the processor, based on the pull force and the impact of the pull force on the vehicle.

Also in an exemplary embodiment, the processor is further configured to at least facilitate: determining one or more corrective actions for the vehicle to mitigate the impact of the pull force, based on the sensor data; and automatically controlling braking, steering, or propulsion of the vehicle, in accordance with instructions provided by the processor to a braking system, a steering system, or propulsion system of the vehicle to implement the one or more corrective actions.

Also in an exemplary embodiment, the processor is further configured to at least facilitate determining, using the perception sensor data, a zone classification for the vehicle, wherein the zone classification is divided into three potential zones; namely, (i) a pre-event zone, (ii) an event zone, and (iii) a post-event zone, and wherein the one or more corrective actions are dependent upon a current value of the zone classification for the vehicle.

Also in an exemplary embodiment, the one or more corrective actions are based at least in part on a plurality of parameters from the vehicle dynamics sensor data that include lateral and longitudinal distances and relative lateral and longitudinal velocities between the vehicle and the one or more additional vehicles.

Also in an exemplary embodiment, the processor is further configured to provide a visual or audible alert to indicate pull force mitigation to the driver.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
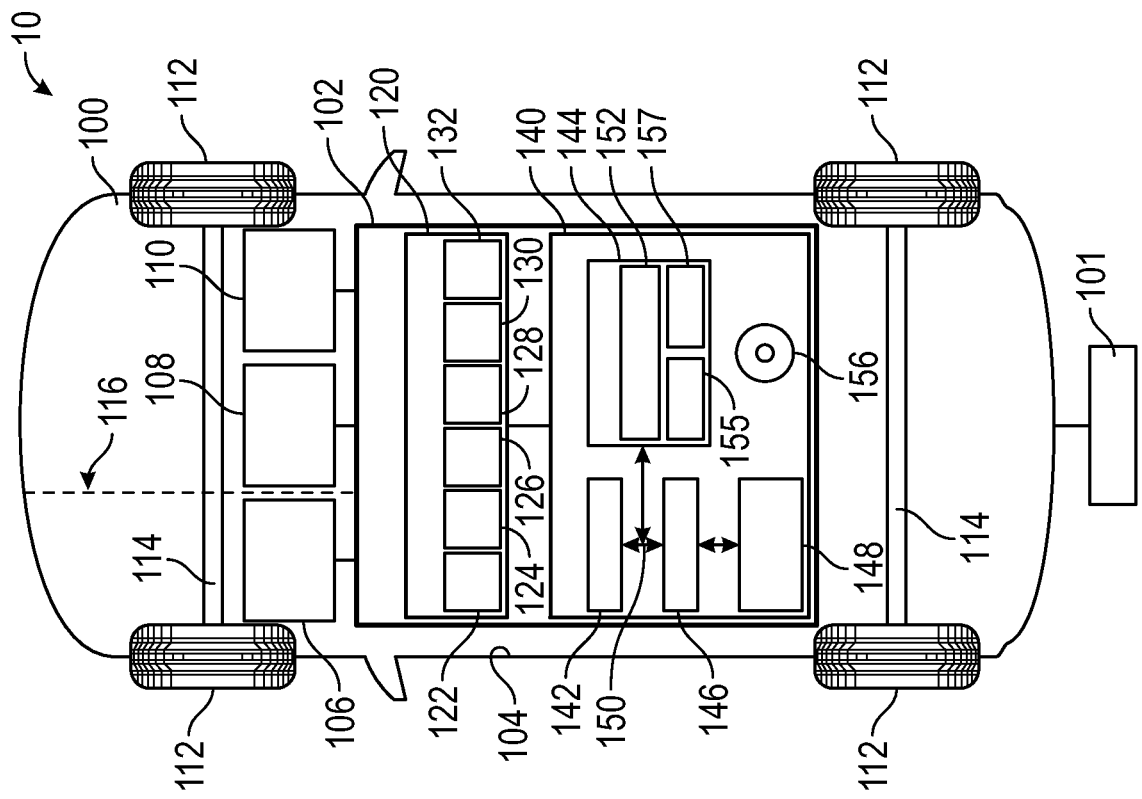
FIG. 1 is a functional block diagram of a vehicle assembly comprising a vehicle towing a trailer, depicted along with another vehicle in which the vehicle assembly may pass on a roadway, and in which the vehicle has a control system for identifying and mitigating pull force impacts from the passing such other vehicles, in accordance with exemplary embodiments.
Figure 1:
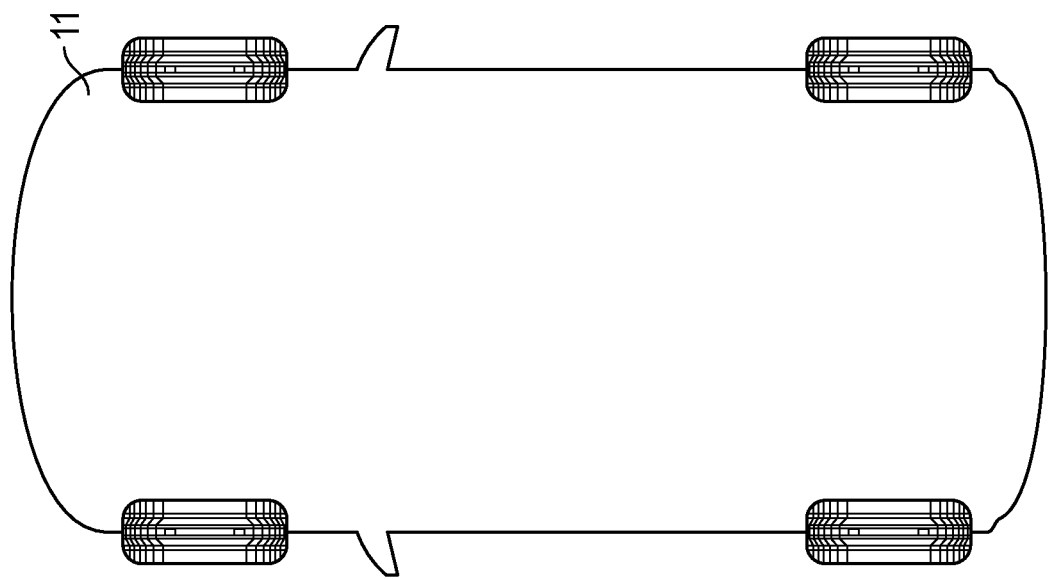

FIG. 1 illustrates a vehicle assembly 10, depicted along with a target vehicle 11. In various embodiments, the vehicle assembly 10 is configured to pass the target vehicle 11 when travelling along a roadway or path (collectively referred to as a "roadway" herein). As depicted in FIG. 1, in certain embodiments the vehicle assembly 10 comprises a vehicle 100 (also referred to herein as the "host vehicle" 100) and a trailer 101 that is hitched and/or otherwise coupled to the vehicle 100 (such that the vehicle 100 tows the trailer 101). In certain embodiments, the vehicle assembly 10 may instead comprise just the vehicle 100 of FIG. 1, without a trailer 101. Also in various embodiments, the target vehicle 11 may comprise a truck and/or other relatively large vehicle; however, this may also vary in certain embodiments.

As discussed in greater detail further below, in various embodiments the vehicle 100 includes a control system 102 that is configured for identifying and mitigating pull force impacts from the passing of other vehicles (such as the target vehicle 11), among other possible functions. Specifically, as explained in greater detail further below in connection with the process 200 of FIG. 2, the implementations of FIGS. 3 and 4, and the sub-processes of FIGS. 4 and 5, in various embodiments the control system 102 analyzes various sensor data that includes perception sensor data and vehicle dynamics sensor data, and uses these different types of sensor data to identify the target vehicle 11, determine a pull force and resulting impact expected to result from the vehicle assembly 10 (and/or in certain embodiments, the vehicle 100) passing the target vehicle 11 along a roadway, and implement countermeasures to mitigate the impact of the pull force on the vehicle 100.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

Also in various embodiments, the trailer 101 may comprise any number of different types of trailers and/or other types of mobile platforms, for example that are coupled to the vehicle 100 and move along with the vehicle 100. While the trailer 101 is depicted in FIG. 1 as having four wheels, it will be appreciated that the number of wheels may vary in different embodiments. Also as noted above, in certain embodiments, the vehicle 100 may not be coupled to a trailer 101, such that the vehicle assembly 10 may comprise only the vehicle 100 itself in such embodiments.

In addition, also in various embodiments, the target vehicle 11 may also comprise any number of different types of vehicles and/or other types of mobile platforms. As noted above, in certain embodiments, the target vehicle 11 comprises a large vehicle, such as a semi-truck, other type of truck, bus, and/or other large automotive vehicle. However, it will be appreciated that the type of target vehicle 11 may vary in different embodiments, and may also have any number of wheels. It will similarly be appreciated that the vehicle 100 (and vehicle assembly 10) of FIG. 1 in various embodiments is configured to detect and mitigate pull force and its effects when passing any number of different types of target vehicles 11 along any number of different types of roadways.

As depicted in FIG. 1, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In various embodiments, the drive system 110 comprises a propulsion system. In various embodiments, the drive system 110 comprises one or more engines and/or motors (e.g., that may be powered in various embodiments by gasoline, diesel, electricity, rechargeable energy storage systems, hydrogen, biofuels, and/or other techniques), coupled with a transmission thereof. In various embodiments, the drive system 110 may vary, and for example may also include any number of different types of engines, motors, other systems, and/or combinations thereof. In various embodiments, the vehicle 100 comprises a fully autonomous and/or partially autonomous vehicle, in which the drive system 110 (and, in various embodiments, other components as well) are operated in full or in part automatically via a computer system of the vehicle 100, such as via the control system 102 described herein.

As depicted in FIG. 1, the vehicle also includes a braking system 106. In exemplary embodiments, the braking system 106 controls braking of the vehicle 100 using braking components that are controlled via inputs provided via processor-based instructions and/or driver-based instructions (e.g., via a brake pedal). In various embodiments in which the vehicle 100 comprises a fully autonomous and/or partially autonomous vehicle, braking system 106 is operated in full or in part automatically via a computer system of the vehicle 100, such as via the control system 102 described herein.

Also as depicted in FIG. 1, the vehicle also includes a steering system 108. In exemplary embodiments, the steering system 108 controls steering of the vehicle 100 using as steering column that is controlled via inputs provided via processor-based instructions and/or driver-based instructions (e.g., via a steering wheel). In various embodiments in which the vehicle 100 comprises a fully autonomous and/or partially autonomous vehicle, the steering system 108 is operated in full or in part automatically via a computer system of the vehicle 100, such as via the control system 102 described herein.

In the embodiment depicted in FIG. 1, the control system 102 is coupled to the braking system 106, the steering system 108, and the drive system 110. In various embodiments, the control system 102 may also be coupled to one or more other systems and/or components of the vehicle 100 and/or the trailer 101. Also as depicted in FIG. 1, in various embodiments, the control system 102 includes a sensor array 120 and a controller 140, as described below.

In various embodiments, the sensor array 120 includes various sensors that obtain sensor data for use in identifying other vehicles (such as the target vehicle 11 of FIG. 1), determining the pull force and impacts thereof from passing the other vehicles, and for determining actions for mitigating impacts of the pull force, among other potential functionality for the vehicle 100 and/or the vehicle assembly 10. In the depicted embodiment, the sensor array 120 includes one or more cameras 122, other detection sensors 124, speed sensors 126, accelerometers 128, inertial measurement unit (IMU) sensors 130, and environmental sensors 132. In certain embodiments, the sensor array 120 may also include one or more other sensors.

In various embodiments, the cameras 122 are mounted on an outside surface of the body 104 of the vehicle 100 and/or are positioned facing outside the vehicle 100. In various embodiments, the cameras 122 are configured to identify other vehicles (such as the target vehicle 11) and obtain information pertaining thereto (e.g., as to dimensions of the target vehicle 11, movement thereof, distance from the host vehicle 100, and so on).

In various embodiments, the other detection sensors 124 are likewise mounted on an outside surface of the body 104 of the vehicle 100 and/or are positioned facing outside the vehicle 100. In addition, also in various embodiments, the other detection sensors 124 are also configured to identify other vehicles (such as the target vehicle 11) and obtain information pertaining thereto (e.g., as to dimensions of the target vehicle 11, movement thereof, distance from the host vehicle 100, and so on). In various embodiments, the other detection sensors 124 may comprise one or more radar, Lidar, sonar, infrared, and/or other detection sensors.

In various embodiments, the speed sensors 126 measure an amount of speed (and/or changes thereof) of the vehicle 100. In certain embodiments, the speed sensors 126 comprise wheel speed sensors that measure a speed of one or more of the wheels 112 of the vehicle 100.

In certain other embodiments, the speed sensors 126 may comprise one or more other types of sensors that measure parameters pertaining to movement of the vehicle 100, such as lateral and longitudinal movement of the vehicle 100.

In various embodiments, the accelerometers 128 measure an acceleration (and/or changes thereof) of the vehicle 100. In certain embodiments, the accelerometers measure both lateral and longitudinal acceleration for the vehicle 100.

In various embodiments, the inertial measurement unit (IMU) sensors 130 measure sensor data pertaining to dynamic operation of the vehicle 100. In certain embodiments, the IMU sensors 130 measure sensor data as to accelerations, angular rates, and orientation of the vehicle 100 and the body 104 thereof, among other possible data.

In various embodiments, the environmental sensors 132 measure conditions of an environment surrounding the vehicle 100. In certain embodiments, the environmental sensors 132 measure sensor data as to ambient pressure, wind speed, air density, and so on with respect to an environment in proximity to the vehicle 100.

In various embodiments, the controller 140 is coupled to the sensor array 120 and to the braking system 106, steering system 108, and drive system 110 (e.g., propulsion system) of the vehicle 100. In certain embodiments, the controller 140 may also be coupled to and/or components of the vehicle 100 and/or trailer 101.

In various embodiments, the controller 140 receives sensor data from the sensor array 120, processes the sensor data, and identifies and mitigates pull force impacts from the passing of other vehicles (such as the target vehicle 11 of FIG. 1). In various embodiments, the controller 140 mitigates the pull identifies the pull force and impacts thereof based on the sensor data, and mitigates the pull force impacts via recommendations provided to a driver of the vehicle 100 and/or through automated control of vehicle 100 movement via instructions that are provided to an executed by the braking system 106, steering system 108, and/or drive system 110 (e.g., propulsion system) based on the processing of the sensor data, such as described further below in connection with the process 200 of FIG. 2 and implementations and sub-processes of FIGS. 3-6. In addition, in certain embodiments, the controller 140 may also control other features of the vehicle 100, such as other automatic driving functionality, and so on.

In various embodiments, the controller 140 comprises a computer system (and is also referred to herein as computer system 140), and includes a processor 142, a memory 144, an interface 146, a storage device 148, and a computer bus 150. In various embodiments, the controller (or computer system) 140 controls vehicle 100 operation, including identifying and mitigating pull force impacts from the passing of other vehicles (such as the target vehicle 11). In various embodiments, the controller 140 provides these and other functions in accordance with the steps of the process 200 of FIG. 2 and the implementations and sub-processes of FIGS. 3-6.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and described further below in connection therewith and in connection with the implementations and sub-processes of FIGS. 3-6.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more tables 155 (e.g., including look-up tables) and other stored values 157 (e.g., including threshold values), including for identifying and mitigating pull force effects based on the processing of the sensor data that is obtained from the sensor array 120.

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and described further below in connection therewith. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
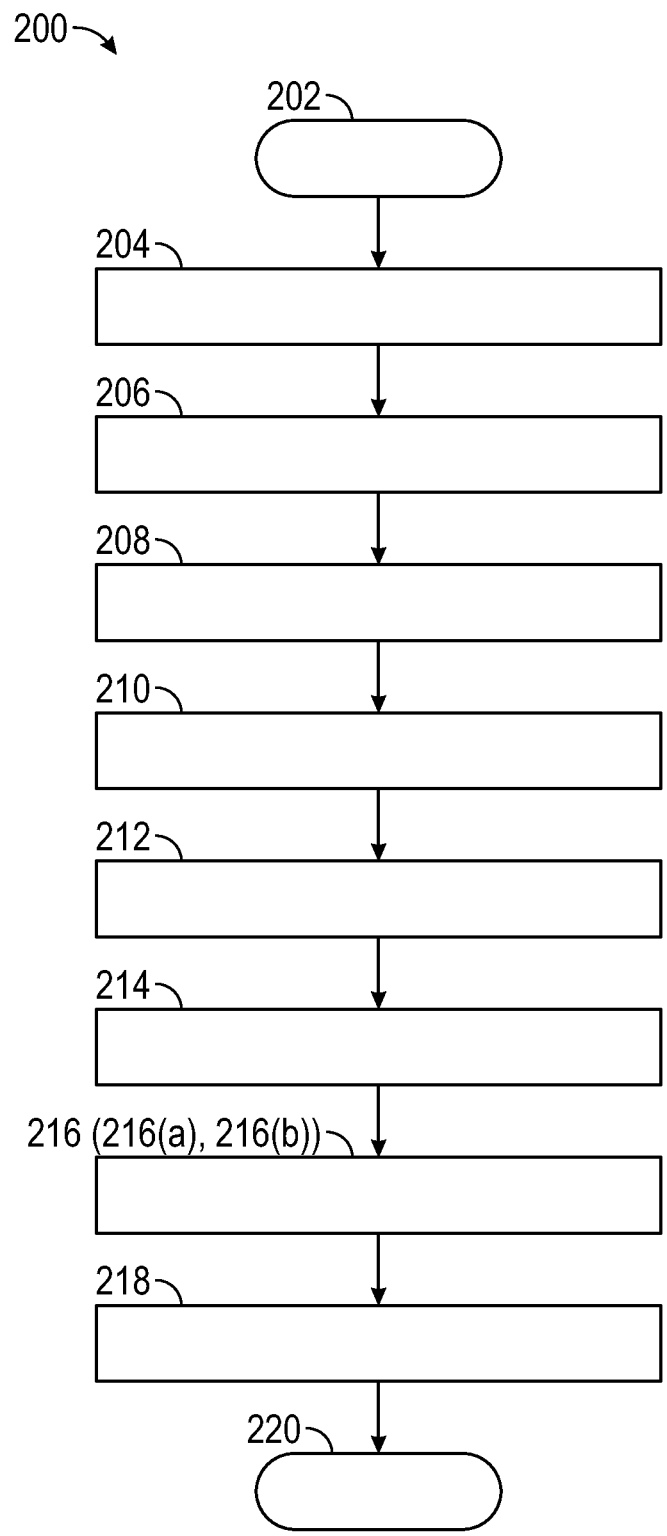
FIG. 2 is a flowchart of process for identifying and mitigating pull force impacts from the passing such other vehicles, in accordance with exemplary embodiments, and that can be implemented in connection with the vehicle and control system of FIG. 1, in accordance with exemplary embodiments.

FIG. 2 provides a flowchart of process 200 for—predicting, identifying and mitigating pull force impacts from the passing such other vehicles, in accordance with exemplary embodiments. In various embodiments, the process 200 may be implemented in connection with the vehicle assembly 10, including the vehicle 100 and the control system 102 of FIG. 1, and components thereof.

The process 200 is described below in connection with FIG. 2 as well as in connection with FIGS. 3 and 4 (which depict implementations of the process 200 of FIG. 2 along a roadway in which the vehicle 100 of FIG. 1 may be travelling) and FIGS. 5 and 6 (which depict exemplary steps of the process 200 of FIG. 2, namely, steps of determining countermeasures for the vehicle in passing another vehicle along with the roadway), in accordance with exemplary embodiments.

As depicted in FIG. 2, the process 200 begins at step 202. In one embodiment, the process 200 begins when a vehicle is turned "on" or begins operation, for example during a current vehicle drive. For example, in various embodiments, the process 200 may also begin when a user approaches or enters the vehicle 100, or when a user turns on the vehicle and/or a driver system or motor therefor (e.g. by turning a key, engaging a keyfob or start button, and so on). In one embodiment, the steps of the process 200 are performed continuously during operation of the vehicle.

In various embodiments, perception data is obtained at step 204. In various embodiments, perception sensor data is obtained from various sensors of the sensor array 120 of FIG. 1 with respect a roadway in which the vehicle 100 is travelling along with one or more other vehicles (e.g., such as the target vehicle 11 of FIG. 1). In certain embodiments, the perception sensor data includes sensor data obtained from the one or more cameras 122 and/or other detection sensors 124 of FIG. 1 as to the roadway in which the vehicle 100 is travelling, including other vehicles travelling along the roadway such as the target vehicle 11 of FIG. 1 (e.g., including dimensions and movement of the target vehicle 11).

Also in various embodiments, vehicle dynamics sensor data is obtained at step 206. In various embodiments, vehicle dynamics sensor data is obtained from various sensors of the sensor array 120 of FIG. 1 with respect dynamic conditions of the vehicle 100, including movement of the vehicle 100 and environmental conditions surrounding the vehicle 100 (e.g., including, among other possible data, speed, acceleration, and IMU sensor data for the vehicle 100, and environmental sensor data such as ambient pressure, wind speed, air density, and so on with respect to an environment in proximity to the vehicle 100, and so on).

In various embodiments, one or more other vehicles are identified at step 208. In various embodiments, the processor 142 of FIG. 1 identifies one or more other target vehicles (such as the target vehicle 11 of FIG. 1) that the vehicle 100 (and/or vehicle assembly 10) of FIG. 1 are likely to pass along the roadway in which the vehicle 100 (and/or vehicle assembly 10) of FIG. 1 is travelling. In various embodiments, the identification of the target vehicle(s) is made by the processor 142 based on the sensor data obtained from the sensor array 120 of FIG. 1 during the above-described step 204. In various embodiments, the identification of the target vehicle includes an identification of the presence of the target vehicle along with dimensions and movement (e.g., lateral and longitudinal position, velocity, and acceleration) thereof.

Also in various embodiments, zones (or regions) are classified with respect to the vehicle passing event (step 210). Specifically, in various embodiments, a classification is made with respect to the following zones (or regions): (i) a pre-event zone; (ii) an event zone; and (iii) a post-event zone.

In various embodiments, the pre-event zone refers to the geographic and/or time region or zone before the vehicle 100 begins passing the target vehicle(s) (e.g., the target vehicle 11 of FIG. 1). Specifically, in certain embodiments, the pre-event zone refers to the geographic and/or time region or zone before the vehicle 100 is adjacent to the target vehicle(s) (e.g., the target vehicle 11 of FIG. 1).

Also in various embodiments, the event zone refers to the geographic and/or time region or zone during which the vehicle 100 is passing the target vehicle(s) (e.g., the target vehicle 11 of FIG. 1). Specifically, in certain embodiments, the event zone refers to the geographic and/or time region or zone in which the vehicle 100 is adjacent to the target vehicle(s) (e.g., the target vehicle 11 of FIG. 1).

Also in various embodiments, the post-event zone refers to the geographic and/or time region or zone shortly after which the vehicle 100 has passed the target vehicle(s) (e.g., the target vehicle 11 of FIG. 1). Specifically, in certain embodiments, the event zone refers to the geographic and/or time region or zone shortly after the vehicle 100 is adjacent to the target vehicle(s) (e.g., the target vehicle 11 of FIG. 1).

In various embodiments, the classification of the event zones (or regions) is made by the processor 142 of FIG. 1 based on the sensor data from the sensor array 120 of FIG. 1. Specifically, in various embodiments, the classification of the event zones (or regions) is made by the processor 142 based on the perception sensor data of step 204.

Also in various embodiments, the classification of zones of step 210 is utilized in determining which sensor data to use in subsequent steps of the process 200 (including the determination of the pull force and impact thereof in steps 212 and 214 determination and implementation of countermeasures to mitigate the pull force impact in steps 216 and 218, as described in greater detail below). Specifically, in various embodiments: (i) the perception sensor data of step 204 is utilized while the vehicle 100 is in the pre-event zone; (ii) both the perception sensor data of step 204 and the vehicle dynamics sensor data of step 206 are utilized (based on fused sensor data from the perception sensor data and the vehicle dynamics sensor data) while the vehicle 100 is in the event zone; and (iii) the vehicle dynamics sensor data of step 206 alone while the vehicle 100 is in the post-event zone. In various embodiments, the classification of zones may also help determine which countermeasures are to be taken by the vehicle 100 to mitigate the impact of the pull force on the vehicle 100.

In various embodiments, the pull force is determined (step 212). In various embodiments, a determination is made as to the estimated pull force on the host vehicle 100 as a result of its passing of another vehicle (such as the target vehicle 11 of FIG. 1). In various embodiments, the processor 142 of FIG. 1 makes the pull force determination of step 212 using sensor data of steps 204 and/or 206 depending upon the current classification of step 210. Specifically, in various embodiments, the processor 142 determines the pull force based on: (i) the perception sensor data of step 204 alone while the vehicle 100 is in the pre-event zone; (ii) the perception sensor data of step 204 and the vehicle dynamics sensor data of step 206 fused together while the vehicle 100 is in the event zone; and (iii) the vehicle dynamics sensor data of step 206 alone while the vehicle 100 is in the post-event zone.

In various embodiments, during step 212, the processor 142 utilizes a probabilistic algorithm to detect the lateral force of the target vehicle 11 that is passing by the host vehicle 100 (and/or passing by the vehicle assembly 10 of FIG. 1). In various embodiments, the processor 142 makes this determination in accordance with the following equation (Equation 1):

$$(\hat{F}_h, \hat{F}_t) = f(v_1, \hat{v}_2, V_h, V_a, P_0, W_h, \hat{W}_a, \hat{W}_t, A_h, \hat{A}_a, \hat{A}_t, H_h, \hat{H}_t, \hat{H}_a, D_{ha}, D_{ah}, D_{ta}, D_{at}, a_h, a_a, a_{y_h}, a_{y_a}, \rho)$$

in which the parameters are defined in connection with the table below (Table 1):

| Symbol | Definition |
|---|---|
| $\hat{F}_h$ | Estimated Pull-Force of Host Vehicle |
| $\hat{F}_t$ | Estimated Pull Force of Trailer |
| $v_1$ | Wind speed |
| $\hat{v}_2$ | Estimated wind speed between truck and large passing vehicle |
| $V_h$ | Velocity of host vehicle |
| $V_a$ | Velocity of large passing vehicle |
| $P_0$ | Pressure |
| $W_h$ | Width of host vehicle |
| $\hat{W}_a$ | Estimated width of large passing vehicle |
| $\hat{W}_t$ | Estimated width of trailer |
| $A_h$ | Estimated area of host vehicle |
| $\hat{A}_a$ | Estimated area of large passing vehicle |
| $\hat{A}_t$ | Estimated area of trailer |
| $H_h$ | Height of host vehicle |
| $\hat{H}_a$ | Estimated height of large passing vehicle |
| $\hat{H}_t$ | Estimated height of trailer |
| $D_{ha}$ | Lateral distance between host vehicle and large passing vehicle |
| $D_{ta}$ | Lateral Distance between trailer and large passing vehicle |
| $D_{ah}$ | Longitudinal distance between host vehicle and large passing vehicle |
| $D_{at}$ | Longitudinal distance between trailer and large passing vehicle |
| $a_h$ | Acceleration of host vehicle |
| $a_a$ | Acceleration of large passing vehicle |
| $\rho$ | Air density |
| $a_{y_h}$ | Lateral acceleration of host vehicle |
| $a_{y_a}$ | Lateral acceleration of large passing vehicle |

Figure 3:
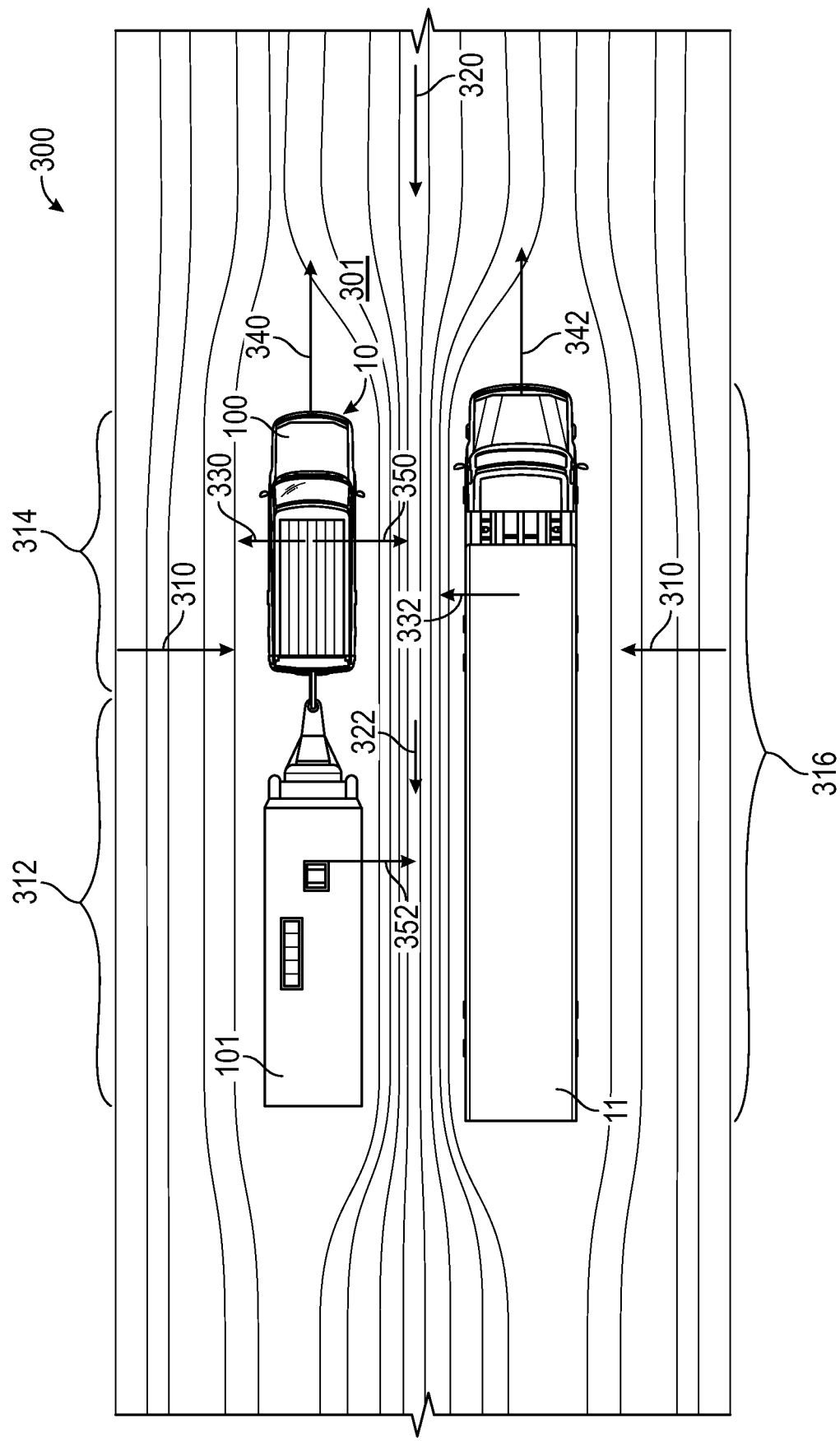
FIGS. 3 and 4 depict implementations of the process of FIG. 2 along a roadway in which the vehicle of FIG. 1 may be travelling, in accordance with exemplary embodiments.
Figure 4:
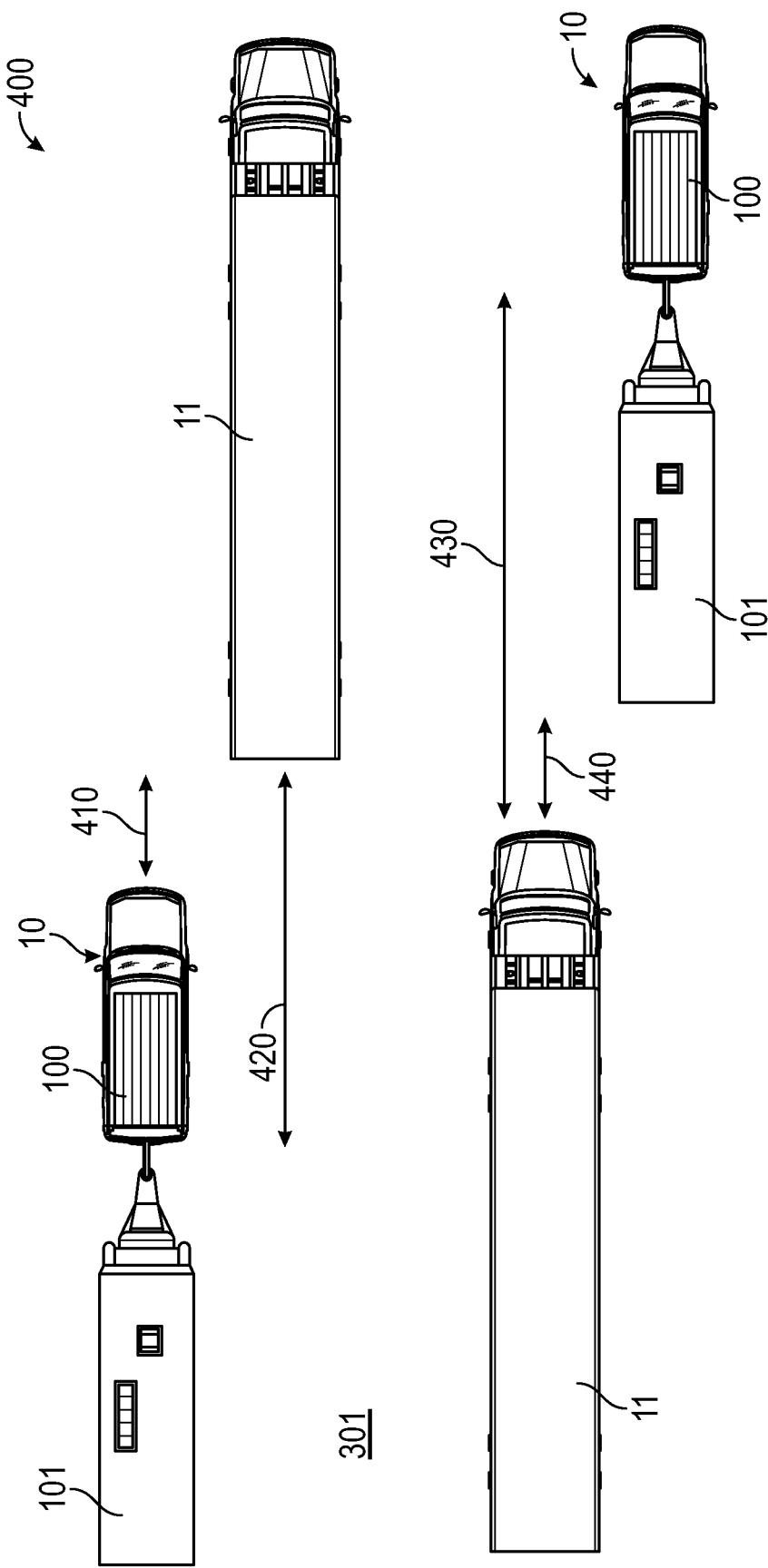

With reference now to FIGS. 3 and 4, illustrations 300, 400 are provided, respectively, with respect to exemplary implementations of the determination of the pull force in step 212 of FIG. 2. Both FIGS. 3 and 4 depict illustrations in which the vehicle 100 is travelling along a roadway 301 with a trailer 101 as part of a vehicle assembly 10 while passing a relatively larger target 11 (e.g., a truck). It will be appreciated that in certain other embodiments the circumstance of FIGS. 3 and 4 may vary, for example in that the vehicle 100 may be travelling without the trailer 101 in certain circumstances, and/or that the sizes and/or types of the vehicle 100, trailer 101, and/or target vehicle 11 may vary, and so on.

First, FIG. 3 depicts an implementation of the event zone in which the vehicle assembly 10 is passing the target vehicle 11.

As illustrated in FIG. 3, in various embodiments while the vehicle assembly 10 is in the event zone (as defined above), various trailer parameters 312 may be obtained from the sensor data (including the perception sensor data and the vehicle dynamics sensor data), such as the trailer length ($L_T$), trailer width ($W_T$), trailer height ($H_T$), and trailer area ($A_T$).

Also as illustrated in FIG. 3, in various embodiments while the vehicle assembly 10 is in the event zone (as defined above), various host vehicle 100 parameters 314 may be obtained from the sensor data (including the perception sensor data and the vehicle dynamics sensor data), such as the host vehicle length ($L_h$), host vehicle width ($W_h$), host vehicle height ($H_h$), and host vehicle area ($A_h$).

In addition, also as illustrated in FIG. 3, in various embodiments while the vehicle assembly 10 is in the event zone (as defined above), various target vehicle 11 parameters 316 may be obtained from the sensor data (including the perception sensor data and the vehicle dynamics sensor data), such as the target vehicle length ($L_a$), target vehicle width ($W_a$), target vehicle height ($H_a$), and target vehicle area ($A_a$).

Also as illustrated in FIG. 3, environmental parameter values are obtained for environmental conditions surrounding the vehicle 100 and the roadway 301, including the air density ($\rho$) 310, a first wind speed (v1) 320 in front of the vehicle, a second wind speed (v2) 322 between the vehicle assembly 10 and the target vehicle 11. In various embodiments, these values are obtained by and/or are calculated based on sensor data obtained via one or more environmental sensors 132 of FIG. 1.

In addition, also as illustrated in FIG. 3, various dynamic movement parameter values are obtained for the vehicle assembly 10 (e.g., for the host vehicle 100 thereof) and for the target vehicle 11. In various embodiments, these dynamic values include the following: (i) a lateral acceleration ($a_{y_h}$) 330 for the host vehicle 100; (ii) a lateral acceleration ($a_{y_a}$) 332 for the target vehicle 11; (iii) longitudinal dynamic values 340 for the host vehicle 100 (including host vehicle velocity $V_h$ and acceleration $a_h$); and (iv) longitudinal dynamic values 342 for the target vehicle 11 (including target vehicle velocity $V_a$ and acceleration $a_a$).

In addition, FIG. 3 also illustrates the determined pull force values during the event zone for the process 200 as result of passing the target vehicle; namely, (i) a first pull force $F_h$ 350 on the host vehicle 100; (ii) a second pull force $F_t$ 352 on the trailer 101.

Next, FIG. 4 depicts implementations of both (a) the pre-event zone before the vehicle assembly 10 passes the target vehicle 11; and (b) the post-event zone after the vehicle assembly 10 passes the target vehicle 11.

As depicted in the upper portion of FIG. 4, during the pre-event zone (as defined earlier in this Application), in various embodiments the parameters include a first distance ($D_{ha}$) 410 and a second distance ($D_{ta}$) 420. In various embodiments, the first distance ($D_{ha}$) 410 comprises a lateral distance between the host vehicle 100 and the target vehicle 11. Also in various embodiments, the second distance ($D_{ta}$) 420 comprises a lateral distance between the trailer 101 and the target vehicle 11. In various embodiments, these distances are estimated by the processor 142 of FIG. 1 using sensor data from the sensor array 120 of FIG. 1, such as one or more of the cameras 122 and/or other detection sensors 124.

In addition, as depicted in the lower portion of FIG. 4, during the post-event zone (as defined earlier in this Application), in various embodiments the parameters include a third distance ($D_{ah}$) 430 and a fourth distance ($D_{at}$) 440. In various embodiments, the third distance ($D_{ah}$) 430 comprises a longitudinal distance between the host vehicle 100 and the target vehicle 11. Also in various embodiments, the fourth distance ($D_{at}$) 440 comprises a lateral distance between the trailer 101 and the target vehicle 11. In various embodiments, these distances are estimated by the processor 142 of FIG. 1 using sensor data from the sensor array 120 of FIG. 1, such as one or more of the cameras 122 and/or other detection sensors 124.

In various embodiments, the impact of the pull force is determined (step 214). In various embodiments, a determination is made as to the impact of the pull forces on the vehicle assembly 10 (including the vehicle 100 and trailer 101 thereof). In various embodiments, the determined impacts include estimated impacts on oscillation, lateral and longitudinal velocity, and lateral and longitudinal acceleration of the vehicle 100 and the trailer 101 due to the pull forces on the vehicle 100 and the trailer 101, as made by the processor 142 of FIG. 1 based on an analysis of the pull forces in combination with the dynamic vehicle sensor data.

In addition, in various embodiments, countermeasures are determined to mitigate the pull forces and the impacts thereof on the vehicle 100 and the trailer 101 (step 216). In various embodiments, the countermeasures are determined by the processor 142 based on the pull forces determined in step 212 and the impacts determined in step 214, in combination with the vehicle dynamics sensor data.

In various embodiments, the types of countermeasures may be dependent, in whole or in part, based on the current conditions and the classified zone as determined in step 210.

For example, in various embodiments, when the vehicle 100 (or vehicle assembly 10) is in the pre-event zone, the countermeasures may include the following, among others: (i) preventing the host vehicle 100 from becoming adjacent to the target vehicle 11 (e.g., by adjusting a speed of the vehicle 100) when the pull force is estimated to exceed a predetermined threshold; (ii) executing pre-emptive lane changes when possible to avoid pull forces that exceed a predetermined threshold; and (iii) increasing the gap between the host vehicle 100 and the target vehicle 11 using a predictive offset before the host vehicle 100 and the target vehicle 11 become adjacent.

Also in various embodiments, when the vehicle 100 (or vehicle assembly 10) is in the event zone, the countermeasures may include the following, among others: (i) adjusting the speed of the host vehicle 100 (e.g., by changing a current speed and/or by changing an adaptive cruise control speed and/or speed of the vehicle 100 to reduce the resultant force); and (ii) modifying the dynamic offset behavior to increase the gap between the host vehicle 100 and the target vehicle 11.

In addition, also in various embodiments, when the vehicle 100 (or vehicle assembly 10) is in the post-event zone, the countermeasures may include the following, among others: (i) adjusting the speed of the host vehicle 100 (e.g., by changing a current speed and/or by changing an adaptive cruise control speed and/or speed of the vehicle 100 to help prevent or reduce impacts from the pull force; (ii) execute lane changes to avoid significantly large pull forces; and (iii) implementing proactive dynamic offsets to avoid significantly large pull forces when adjacency is predicted with pull forces between the target vehicle 11 and the host vehicle 100 that exceed a predetermined threshold.

In various embodiments, during each of the pre-event zone, the event zone, and the post-event zone, the countermeasures utilize one or more gains that are determined via the processor 142 of FIG. 1 that are determined by the processor 142 based on various vehicle dynamics sensor data parameters (e.g., include sizes of the respective vehicles, lateral and longitudinal distances, velocities, and accelerations, and so on). In various embodiments, the gains are executed via instructions provided by the processor 142 to one or more of the braking system 106, steering system 108, and drive system 110 of FIG. 1 that are executed by the one or more of the braking system 106, steering system 108, and drive system 110 in automatically controlling vehicle 100 movement (and/or, in certain embodiments, via recommendations or instructions provided to a driver of the vehicle 100).

Figure 5:
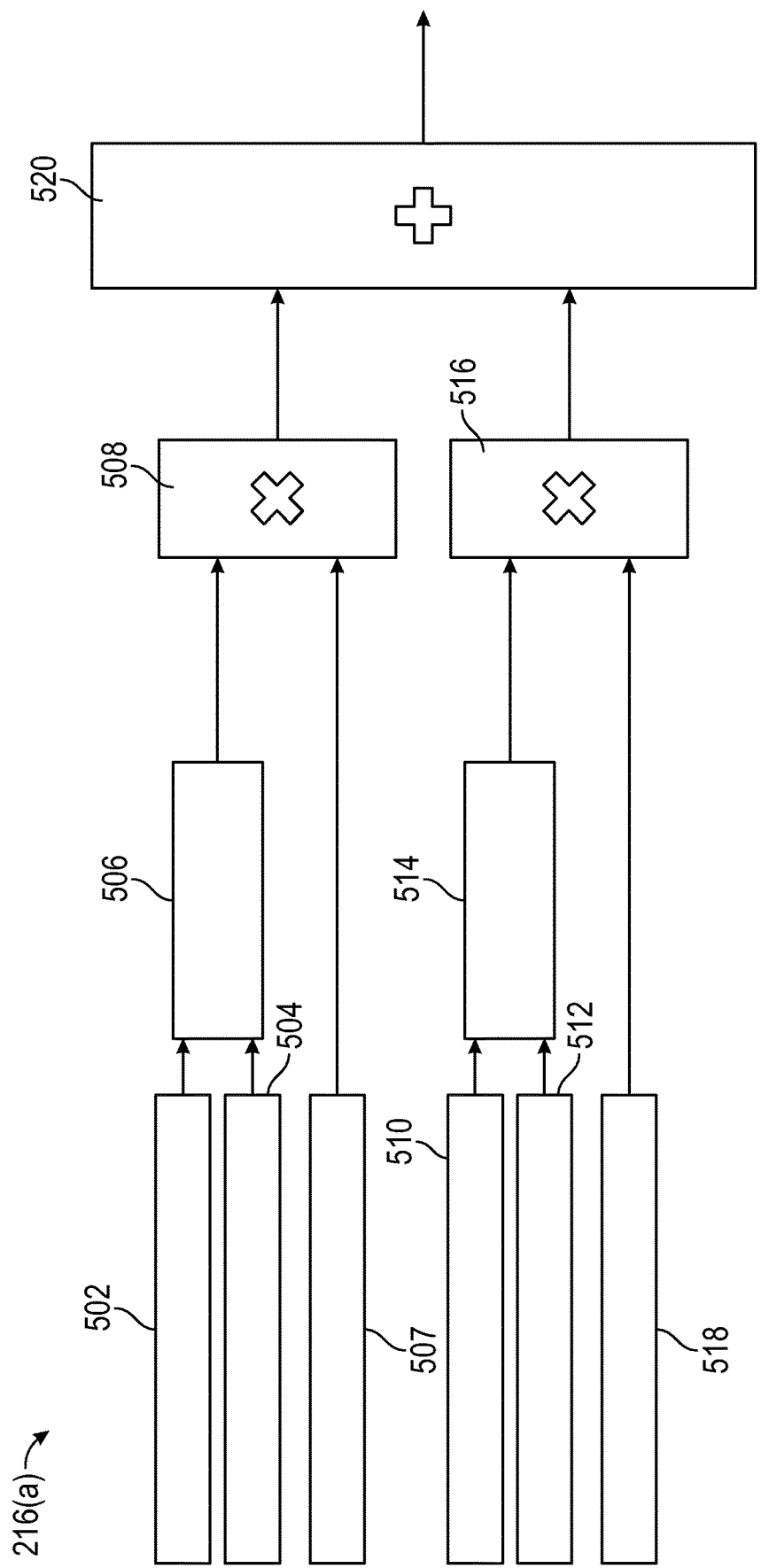
FIGS. 5 and 6 depict exemplary steps of the process of FIG. 2, namely, steps of determining countermeasures for the vehicle in passing another vehicle along with the roadway, in accordance with exemplary embodiments.
Figure 6:
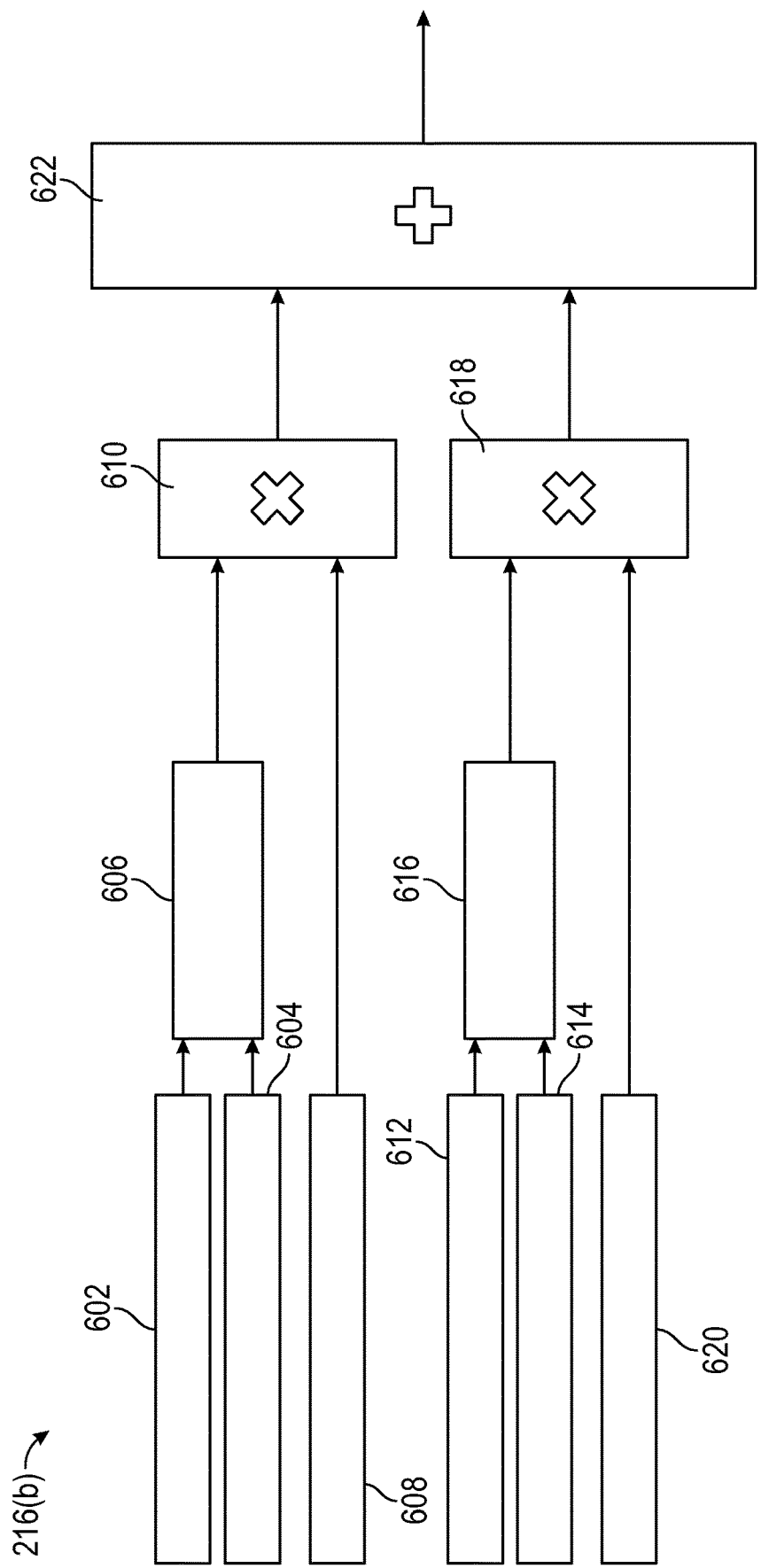

With respect to FIGS. 5 and 6, illustrative steps (or subprocesses) are provided for the determining of the gains for the countermeasures of step 216 of FIG. 2. Specifically: (i) FIG. 5 provides a flowchart of a first subprocess 216(a) for step 216; and (ii) FIG. 5 provides a flowchart of a second subprocess 216(b) for step 216, in accordance with exemplary embodiments.

With reference first to FIG. 5, in an exemplary embodiment the first subprocess 216(a) includes determining a relative longitudinal velocity between vehicles (step 502). In various embodiments, during step 502, the processor 142 of FIG. 1 calculates a relative longitudinal velocity between the target vehicle 11 and the host vehicle 100 of FIG. 1 based on the sensor data.

With continued reference to FIG. 5, a longitudinal distance is also determined between vehicles (step 504). In various embodiments, during step 504, the processor 142 of FIG. 1 calculates a relative longitudinal distance between the target vehicle 11 and the host vehicle 100 of FIG. 1 based on the sensor data.

In various embodiments, the relative longitudinal velocity of step 502 and the longitudinal distance of step 504 are utilized along with a first look-up table 506 to determine an initial longitudinal gain value. Also in various embodiments, a longitudinal error value is determined (step 507). In various embodiments, the longitudinal error value of step 507 pertains to one or more longitudinal vehicle dynamic errors caused by the pull force between the host vehicle 100 and the target vehicle 11. Also in various embodiments, the longitudinal error value of step 507 is utilized in combination with the initial longitudinal gain value from the first gain adaptation 506 in order to obtain an adjusted longitudinal gain value (step 508).

Also in various embodiments, a lateral distance is also determined between vehicles (step 510). In various embodiments, during step 510, the processor 142 of FIG. 1 calculates a relative lateral distance between the target vehicle 11 and the host vehicle 100 of FIG. 1 based on the sensor data, such as the perception sensor data.

In various embodiments, the relative lateral velocity of step 510 and the lateral distance of step 512 are utilized along with a second look-up table 514 to determine an initial lateral gain value. Also in various embodiments, a lateral error value is determined (step 518). In various embodiments, the lateral error value of step 518 pertains to one or more lateral vehicle dynamic errors caused by the pull force between the host vehicle 100 and the target vehicle 11. Also in various embodiments, the lateral error value of step 518 is utilized in combination with the initial lateral gain value from the second gain adaptation 514 in order to obtain an adjusted lateral gain value (step 516).

In various embodiments, the gain values are aggregated (step 520). Specifically, in various embodiments, the adjusted longitudinal gain value of step 508 is aggregated with the adjusted lateral gain value of step 516 in order to derive a combined aggregate gain value during step 520. In various embodiments, the aggregate gain value comprises an aggregate gain (including both longitudinal and lateral components) for use by the processor 142 of FIG. 1 in provided instructions for the countermeasures that are then implemented by one or more of the braking system 106, steering system 108, and/or drive system 110 of FIG. 1. In various embodiments, the determination of the various gain values in the sub-process 216(a) of FIG. 5 is performed via the processor 142 of FIG. 1 using various sensor data from the sensor array 120 of FIG. 1.

With reference now to FIG. 6, in an exemplary embodiment the second subprocess 216(b) includes determining a relative lateral position between vehicles (step 602). In various embodiments, during step 602, the processor 142 of FIG. 1 calculates a relative lateral position between the target vehicle 11 and the host vehicle 100 of FIG. 1 based on the sensor data.

With continued reference to FIG. 6, a longitudinal distance is also determined between vehicles (step 604). In various embodiments, during step 604, the processor 142 of FIG. 1 calculates a relative longitudinal distance between the target vehicle 11 and the host vehicle 100 of FIG. 1 based on the sensor data.

In various embodiments, the relative lateral position of step 602 and the longitudinal distance of step 604 are utilized along with a first gain adaptation 606 to determine an initial gain value. Also in various embodiments, an error value is determined (step 608). In various embodiments, the error value of step 608 pertains to one or more lateral and/or longitudinal vehicle dynamic errors caused by the pull force between the host vehicle 100 and the target vehicle 11. Also in various embodiments, the error value of step 608 is utilized in combination with the initial gain value from the first gain adaptation 606 in order to obtain an adjusted gain value (step 610).

Also in various embodiments, a vehicle yaw rate is also determined (step 612). In various embodiments, during step 612, the processor 142 of FIG. 1 calculates a yaw rate for the vehicle 100 of FIG. 1 based on the sensor data.

In addition, in various embodiments, an error derivative is determined (step 614). In certain embodiments, the error derivative of step 614 comprises an error in yaw rate for the vehicle 100 based o the pull force.

In various embodiments, the relative lateral position velocity of step 612 and the error derivate of step 614 are utilized along with a second look-up table 616 to determine an initial yaw gain value. Also in various embodiments, a derivate of the yaw error is also determined (step 620). In various embodiments, the derivative of the yaw error of step 620 is utilized in combination with the yaw gain value from the second gain adaptation 616 in order to obtain an adjusted yaw gain value (step 618).

In various embodiments, the gain values are aggregated (step 622). Specifically, in various embodiments, the adjusted gain value of step 610 is aggregated with the adjusted yaw gain value of step 618 in order to derive a combined aggregate gain value during step 622. In various embodiments, the aggregate gain value comprises an aggregate gain for use by the processor 142 of FIG. 1 in provided instructions for the countermeasures that are then implemented by one or more of the braking system 106, steering system 108, and/or drive system 110 of FIG. 1. In various embodiments, the determination of the various gain values in the sub-process 216(b) of FIG. 6 is performed via the processor 142 of FIG. 1 using various sensor data from the sensor array 120 of FIG. 1.

With reference back to FIG. 2, in various the countermeasures are implemented (step 218). In various embodiments, the countermeasures determined in step 216 (and including the exemplary subprocesses 216(a) and 216(b) respectively, of FIGS. 5 and 6) are implemented by vehicle 100 gains that are implemented by the braking system 106, the steering system 108, and/or the drive system 110 of FIG. 1 in accordance with instructions provided by the processor 142 of FIG. 1.

Accordingly, methods, systems, and vehicles are provided for determining and mitigating pull forces for a vehicle or vehicle assembly that is passing another vehicle along a roadway. In various embodiments, perception sensor data and vehicle dynamics sensor data is utilized in connection with a processor that identifies the target vehicle to be passed by the host vehicle (or vehicle assembly), classifies respective zones into pre-event, event, and post-event zones, determines the pull force on the vehicle (or vehicle assembly) and the impacts thereof, and determines and implements countermeasures for the different zones for mitigating the impacts of the pull force on the vehicle or vehicle assembly.

It will be appreciated that the systems, vehicles, and methods may vary from those depicted in the Figures and described herein. For example, the vehicle assembly 10 of FIG. 1, including the vehicle 100 of FIG. 1, the control system 102 thereof, and other systems and components thereof, may vary in different embodiments. It will similarly be appreciated that the steps of the process 200 and/or subprocesses of FIGS. 5 and 6 may differ from that depicted in FIG. 2, and/or that various steps and/or subprocesses may occur concurrently and/or in a different order than that depicted in FIGS. 2, 5, and 6. It will also be appreciated that the implementations may also differ from those depicted in the drawings (e.g., in FIGS. 3 and 4) and/or as described herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining sensor data via one or more sensors of a vehicle, the sensor data comprising both perception sensor data and vehicle dynamics sensor data;
   identifying, via a processor, one or more additional vehicles to be passed by the vehicle, using the perception sensor data;
   determining, via the processor using the perception sensor data, a zone classification for the vehicle, wherein the zone classification is divided into three potential zones; namely, (i) a pre-event zone, (ii) an event zone, and (iii) a post-event zone, and wherein the one or more corrective actions are dependent upon a current value of the zone classification for the vehicle; and
   predicting and determining, via the processor, a pull force for the vehicle that is caused by the passing of the vehicle by the one or more additional vehicles along with an impact of the pull force on the vehicle, based on both the perception sensor data and the vehicle dynamics sensor data, specifically, based on:
   the perception sensor data alone, while the vehicle is in the pre-event zone;
   both the perception sensor data and the vehicle dynamics sensor data, namely, based on fused sensor data from the perception sensor data and the vehicle dynamics sensor data, while the vehicle is in the event zone; and the vehicle dynamics sensor data alone, while the vehicle is in the post-event zone.

2. The method of claim 1, further comprising:
automatically taking a vehicle action, in accordance with instructions provided by the processor, based on the predicted pull force and the determined impact of the pull force on the vehicle.

3. The method of claim 2, further comprising:
determining, via the processor, one or more corrective actions for the vehicle to mitigate the impact of the pull force proactively, based on the sensor data, specifically, based on:
the perception sensor data alone, while the vehicle is in the pre-event zone;
both the perception sensor data and the vehicle dynamics sensor data, namely, based on fused sensor data from the perception sensor data and the vehicle dynamics sensor data, while the vehicle is in the event zone; and
the vehicle dynamics sensor data alone, while the vehicle is in the post-event zone.

4. The method of claim 3, wherein the step of automatically taking the vehicle action comprises automatically controlling braking, steering, or propulsion of the vehicle, in accordance with instructions provided by the processor to a braking system, a steering system, or propulsion system of the vehicle to implement the one or more corrective actions.

5. The method of claim 3, wherein the step of automatically taking the vehicle action comprises automatically providing a recommendation for a driver of the vehicle for controlling braking, steering, or propulsion of the vehicle to implement the one or more corrective actions.

6. The method of claim 1, further comprising:
utilizing a pull force impact determined via the processor in a reactive mode to update the prediction model for pre-event detection for upcoming events.

7. A system comprising:
a plurality of sensors configured to obtain sensor data for a vehicle, the sensor data comprising both perception sensor data and vehicle dynamics sensor data; and
a processor that is coupled to the plurality of sensors and that is configured to at least facilitate:
identifying one or more additional vehicles to be passed by the vehicle, using the perception sensor data;
determining, using the perception sensor data, a zone classification for the vehicle, wherein the zone classification is divided into three potential zones; namely, (i) a pre-event zone, (ii) an event zone, and (iii) a post-event zone, and wherein the one or more corrective actions are dependent upon a current value of the zone classification for the vehicle; and
determining a pull force for the vehicle that is caused by the passing of the vehicle by the one or more additional vehicles along with an impact of the pull force on the vehicle, based on both the perception sensor data and the vehicle dynamics sensor data, specifically, based on:
the perception sensor data alone, while the vehicle is in the pre-event zone;
both the perception sensor data and the vehicle dynamics sensor data, namely, based on fused sensor data from the perception sensor data and the vehicle dynamics sensor data, while the vehicle is in the event zone; and
the vehicle dynamics sensor data alone, while the vehicle is in the post-event zone.

8. The system of claim 7, wherein the processor is further configured to at least facilitate:
automatically taking a vehicle action, in accordance with instructions provided by the processor, based on the pull force and the impact of the pull force on the vehicle.

9. The system of claim 8, wherein the processor is further configured to at least facilitate:
determining one or more corrective actions for the vehicle to mitigate the impact of the pull force, based on the sensor data, specifically, based on:
the perception sensor data alone, while the vehicle is in the pre-event zone;
both the perception sensor data and the vehicle dynamics sensor data, namely, based on fused sensor data from the perception sensor data and the vehicle dynamics sensor data, while the vehicle is in the event zone; and
the vehicle dynamics sensor data alone, while the vehicle is in the post-event zone; and
automatically controlling braking, steering, or propulsion of the vehicle, in accordance with instructions provided by the processor to a braking system, a steering system, or propulsion system of the vehicle to implement the one or more corrective actions.

10. The system of claim 8, wherein the processor is further configured to at least facilitate:
determining one or more corrective actions for the vehicle to mitigate the impact of the pull force, based on the sensor data, specifically, based on:
the perception sensor data alone, while the vehicle is in the pre-event zone;
both the perception sensor data and the vehicle dynamics sensor data, namely, based on fused sensor data from the perception sensor data and the vehicle dynamics sensor data, while the vehicle is in the event zone; and
the vehicle dynamics sensor data alone, while the vehicle is in the post-event zone; and
automatically providing a recommendation for a driver of the vehicle for controlling braking, steering, or propulsion of the vehicle to implement the one or more corrective actions.

11. A vehicle comprising:
a body;
a plurality of sensors disposed on or within the body and that are configured to obtain sensor data for the vehicle, the sensor data comprising both perception sensor data and vehicle dynamics sensor data; and
a processor disposed within the body and coupled to the one or more sensors, and that is configured to at least facilitate:
identifying one or more additional vehicles to be passed by the vehicle, using the perception sensor data;
determining, using the perception sensor data, a zone classification for the vehicle, wherein the zone classification is divided into three potential zones; namely, (i) a pre-event zone, (ii) an event zone, and (iii) a post-event zone, and wherein the one or more corrective actions are dependent upon a current value of the zone classification for the vehicle; and
determining a pull force for the vehicle that is caused by the passing of the vehicle by the one or more additional vehicles along with an impact of the pull force on the vehicle, based on both the perception sensor data and the vehicle dynamics sensor data, specifically, based on:

the perception sensor data alone, while the vehicle is in the pre-event zone;
both the perception sensor data and the vehicle dynamics sensor data, namely, based on fused sensor data from the perception sensor data and the vehicle dynamics sensor data, while the vehicle is in the event zone; and
the vehicle dynamics sensor data alone, while the vehicle is in the post-event zone.

12. The vehicle of claim 11, wherein the processor is further configured to at least facilitate:
automatically taking a vehicle action, in accordance with instructions provided by the processor, based on the pull force and the impact of the pull force on the vehicle.

13. The vehicle of claim 12, wherein the processor is further configured to at least facilitate:
determining one or more corrective actions for the vehicle to mitigate the impact of the pull force, based on the sensor data, specifically, based on:
the perception sensor data alone, while the vehicle is in the pre-event zone;
both the perception sensor data and the vehicle dynamics sensor data, namely, based on fused sensor data from the perception sensor data and the vehicle dynamics sensor data, while the vehicle is in the event zone; and
the vehicle dynamics sensor data alone, while the vehicle is in the post-event zone; and
automatically controlling braking, steering, or propulsion of the vehicle, in accordance with instructions provided by the processor to a braking system, a steering system, or propulsion system of the vehicle to implement the one or more corrective actions.

14. The vehicle of claim 11, wherein the processor is further configured to provide a visual or audible alert to indicate pull force mitigation to the driver.

15. The method of claim 1, wherein:
the vehicle is coupled to and towing a trailer as it passes a target that comprises one of the additional vehicles;
the step of determining the pull force comprises determining, via the processor the pull force based on both an estimated first pull force of the host vehicle and estimated second pull force on the trailer, utilizing a probabilistic algorithm based on:
the perception sensor data alone, while the vehicle is in the pre-event zone;
both the perception sensor data and the vehicle dynamics sensor data, namely, based on fused sensor data from the perception sensor data and the vehicle dynamics sensor data, while the vehicle is in the event zone; and
the vehicle dynamics sensor data alone, while the vehicle is in the post-event zone.

16. The method of claim 15, further comprising:
determining, via the processor, an impact of the pull force based on both an impact of the first pull force and an impact of the second pull force, including estimated impacts on oscillation, lateral velocity, longitudinal velocity, lateral acceleration, and longitudinal acceleration of both the vehicle and the trailer; and
determining via the processor, countermeasures based on the first and second pull forces, and the countermeasures dependent on whether the vehicle is in the pre-event zone, the event zone, or the post-event zone.

17. The method of claim 16, wherein the countermeasures include:

when the vehicle is in the pre-event zone: (i) preventing the vehicle from becoming adjacent to the target vehicle, by adjusting a speed of the vehicle, when the pull force is estimated to exceed a predetermined threshold; (ii) executing pre-emptive lane changes to avoid pull forces that exceed a predetermined threshold; and (iii) increasing a gap between the vehicle and the target using a predictive offset before the vehicle and the target become adjacent;
when the vehicle is in the event zone: (i) adjusting the speed of the vehicle; and (ii) modifying dynamic offset behavior to increase the gap between the vehicle and the target; and
when the vehicle is in the post-event zone: (i) adjusting the speed of the vehicle; (ii) executing lane changes to avoid pull forces; and (iii) implementing proactive dynamic offsets to avoid pull forces when adjacency is predicted with pull forces between the target and the vehicle that exceed a predetermined threshold.

18. The method of claim 1, wherein the pull force and the one or more corrective actions are further determined via the processor using a probabilistic algorithm based on:
while the vehicle is in the pre-event zone, each of the following: vehicle length, vehicle width, vehicle height, vehicle area, target length, target width, target height, target area, air density, a first wind speed in front of the vehicle, a second wind speed between the vehicle and the target, vehicle lateral acceleration, target lateral acceleration, longitudinal vehicle velocity, longitudinal vehicle acceleration, longitudinal target velocity, and longitudinal target acceleration;
while the vehicle is in the pre-event zone, each of the following: a first distance comprising a lateral distance between the vehicle and the target, a second distance comprising a lateral distance between the trailer and the target vehicle; and
while the vehicle is in the post-event zone: a third distance comprising a longitudinal distance between the vehicle and the target, and a fourth distance comprising a lateral distance between the trailer and the target.

19. The system of claim 7, wherein the processor is configured to at least facilitate determining the pull force and the one or more corrective actions using a probabilistic algorithm based on:
while the vehicle is in the pre-event zone, each of the following: vehicle length, vehicle width, vehicle height, vehicle area, target length, target width, target height, target area, air density, a first wind speed in front of the vehicle, a second wind speed between the vehicle and the target, vehicle lateral acceleration, target lateral acceleration, longitudinal vehicle velocity, longitudinal vehicle acceleration, longitudinal target velocity, and longitudinal target acceleration;
while the vehicle is in the pre-event zone, each of the following: a first distance comprising a lateral distance between the vehicle and the target, a second distance comprising a lateral distance between the trailer and the target vehicle; and
while the vehicle is in the post-event zone: a third distance comprising a longitudinal distance between the vehicle and the target, and a fourth distance comprising a lateral distance between the trailer and the target.

20. The vehicle of claim 11, wherein the processor is configured to at least facilitate determining the pull force and the one or more corrective actions using a probabilistic algorithm based on:

while the vehicle is in the pre-event zone, each of the following: vehicle length, vehicle width, vehicle height, vehicle area, target length, target width, target height, target area, air density, a first wind speed in front of the vehicle, a second wind speed between the vehicle and the target, vehicle lateral acceleration, target lateral acceleration, longitudinal vehicle velocity, longitudinal vehicle acceleration, longitudinal target velocity, and longitudinal target acceleration;

while the vehicle is in the pre-event zone, each of the following: a first distance comprising a lateral distance between the vehicle and the target, a second distance comprising a lateral distance between the trailer and the target vehicle; and while the vehicle is in the post-event zone: a third distance comprising a longitudinal distance between the vehicle and the target, and a fourth distance comprising a lateral distance between the trailer and the target.

* * * * *